Nov. 14, 1967   A. J. GIGER   3,353,183
MODE SIGNAL COMPENSATION SYSTEM
Filed June 24, 1965   2 Sheets-Sheet 1

INVENTOR
A. J. GIGER
BY
ATTORNEY

United States Patent Office 3,353,183
Patented Nov. 14, 1967

3,353,183
MODE SIGNAL COMPENSATION SYSTEM
Adolf J. Giger, Murray Hill, N.J., assignor to Bell Telephone Laboratories, Incorporated, New York, N.Y., a corporation of New York
Filed June 24, 1965, Ser. No. 466,652
11 Claims. (Cl. 343—117)

ABSTRACT OF THE DISCLOSURE

Accurate pointing of a high frequency antenna toward a distant moving target, such as an earth satellite, may be accomplished by using a simultaneous lobe tracking system of the so-called monopulse type. If tracking is accomplished by sensing an arbitrarily polarized beacon signal radiated by the target, higher order mode signals are employed. Higher order mode signals excited in the antenna are, however, often contaminated by spurious signals resulting from reflections, poor coupler design, or the like. Compensation for undesired spurious signals is accomplished by algebraically combining selected components of a contaminating mode signal with a contaminated mode signal in the proper sense to achieve cancellation.

---

This invention relates to transmission systems in which selected modes of electromagnetic wave energy, propagating in a waveguide system, or the like, are selectively coupled to another system. More particularly, it relates to methods of, and apparatus for, enhancing the characteristic nulls in the higher order difference modes excited in an antenna of a simultaneous lobing tracking system, of the so-called monopulse type, when the antenna is "on target."

In a monopulse system, tracking of a target is accomplished by comparing overlapping pattern or lobe signals received by the antenna to determine the discrepancy, if any, between the direction the antenna is pointing and the direction of the target. The discrepancy is reduced to a set of pointing-error signals which may be used for correcting the pointing direction of the antenna. For a circularly polarized signal received from a target, the two lowest order modes, namely, the $TE_{11}$ and the $TM_{01}$, yield sufficient information with which to produce tracking error signals. The amplitude of the $TM_{01}$ signal is directly proportional to the pointing-error, and the $TE_{11}$ signal provides a reference against which the phase and amplitude of the $TM_{01}$ signals are measured. The horizontal and vertical components of the dominant mode are coupled out individually and supplied along with the $TM_{01}$ signal to the processing equipment. Representative processing equipment is disclosed in an application of G. N. Packard, Serial No. 405,068, filed October 20, 1964 now issued as Patent No. 3,311,916, March 28, 1967. In order to track communications satellites, for example, by way of arbitrarily polarized beacon signals, additional signal modes are required for processing. A coupler suitable for extracting at least four modes of a received signal, namely, the $TM_{01}$, $TE_{01}$, $TE_{11x}$, and $TE_{11y}$, is described in a pending application of A. J. Giger and J. J. Shottle Serial No. 423,453, filed January 5, 1965. Of course, individual couplers may be used, if desired, for the several individual modes.

Theoretically, a mode coupler should extract or launch pure mode signals reaching out into the far-field of the antenna. In particular, the far-field antenna pattern of the $TM_{01}$ and $TE_{01}$ modes should have very deep and coincident nulls. In practice, these desired characteristics are not always realized. It has been found that the pattern nulls are often mere minima, sometimes only as deep as 15 db from the reference. Minima of the $TM_{01}$ and $TE_{01}$ modes, for example, do not always coincide. Further, experience has shown that the depth and location of the minima depend somewhat on the polarization of the incoming signal. Such departure from the ideal is detrimental to the tracking system. It may result in large shifts in the tracking system boresight axis as a function of polarization of the incoming signal.

The nonideal behavior of the higher order mode patterns may stem from any one of a number of effects. With poor coupler design, the coupler itself may not launch pure $TM_{01}$ or $TE_{01}$ mode signals. More generally, the reflecting surfaces of the antenna, e.g., the parabola of a horn antenna, may generate undesired mode signals, and ground reflections may change the radiation patterns of the antenna. Such changes are identical to the generation of undesired mode signals. Notwithstanding the manner in which the undesired mode signals are generated, such signals may be considered to be the two orthogonal components of the fundamental mode, namely, the $TE_{11x}$ and $TE_{11y}$ signals. They both reduce the depth of the nulls, and also may shift the nulls in both azimuth and elevation.

It is accordingly the primary object of the present invention to enhance the depth and shift the position of nulls of the higher order mode signals of a simultaneous lobing tracking system.

It is another object of the invention to compensate for undesired fundamental mode signals which may infiltrate the several independent channels carrying higher order mode signals to a tracking signal processing network.

In accordance with the present invention, these and other objects are achieved by algebraically combining selected components of a contaminating mode signal with a contaminated mode signal, for example, by injecting appropriate amounts of the orthogonal component signals of the fundamental mode into the higher order mode channels with such magnitude and polarity to achieve complete cancellation of the undesired fundamental mode signals. Complete cancellation is obtained by an adjustment of the amplitude and phase of the injected mode energy signal. Further, in accordance with the invention, compensation takes place in a completely passive and lossless way by means of a system of hybrid and phase control networks. By providing two orthogonal balances ($TE_{11x}$ and $TE_{11y}$) of the $TE_{11}$ signal, compensation is obtained for all angles of elliptically (including linearly and circularly) polarized signals.

The invention will be fully apprehened from the following detailed description of an illustrative embodiment thereof, taken in connection with the appended drawings in which.

Figure 1:
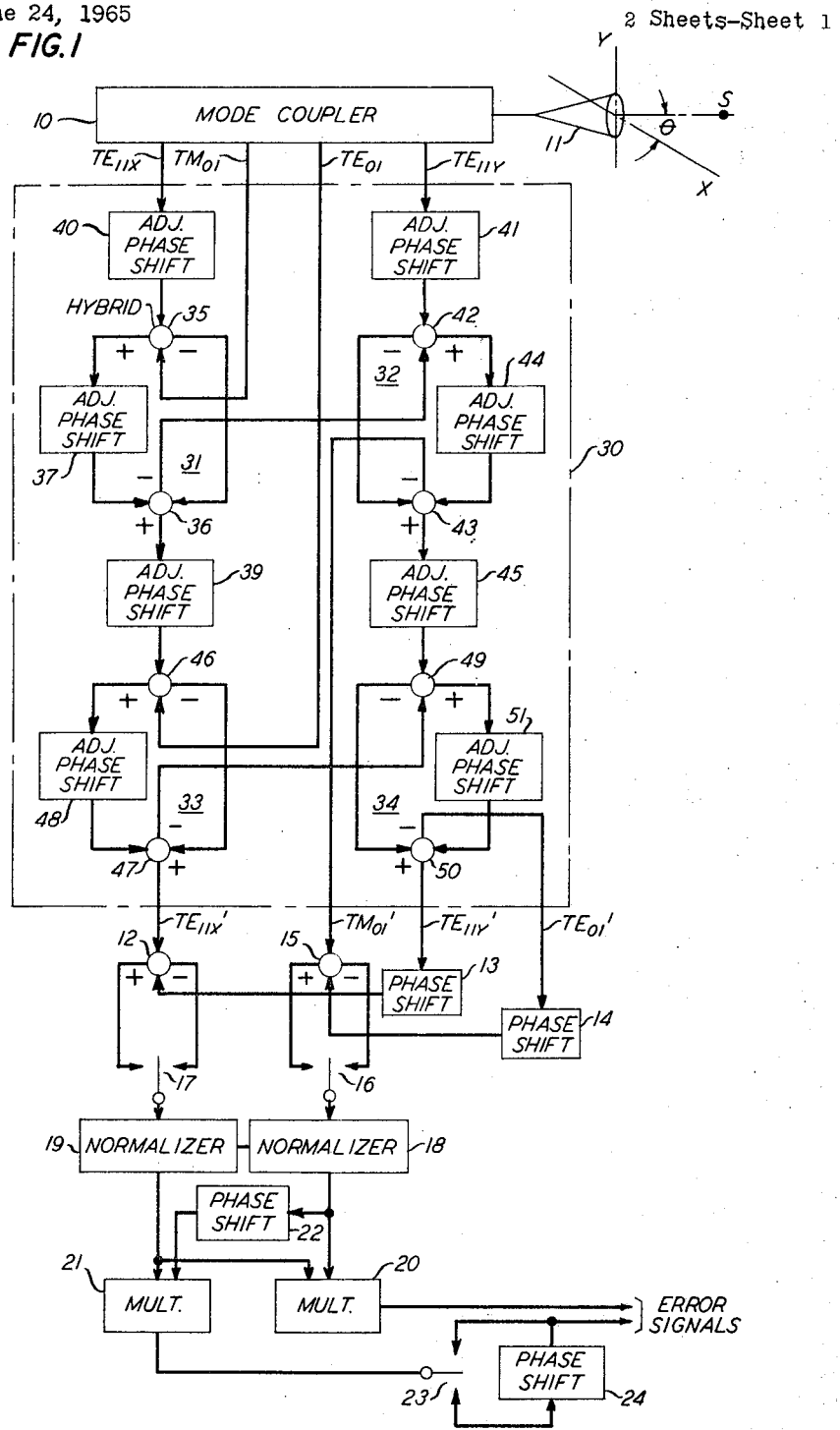
FIG. 1 illustrates in block schematic form a signal processing system which illustrates a typical embodiment of the present invention.

The features, mode of operation, and circuit arrangement of a typical embodiment of the invention are revealed in the block schematic diagram of FIG. 1, wherein a plurality of different electromagnetic mode energy signals, originating for example in mode coupler 10, are processed to develop tracking error signals. Electromagnetic energy is radiated from or received by antenna 11, typically a horn reflector antenna, associated with mode coupler 10. During reception, the several mode signals produced by coupler 10 pass through compensating network 30 before being applied to an error signal processing network. A typical network for selectively processing the compensated signals is shown at the lower portion of the figure. In order to track arbitrarily polarized signals, the $TE_{11x}$ and $TE_{11y}$ reference signals, (designated $TE_{11x}'$ and $TE_{11y}'$ after passing through compensating network 30), are combined in hybrid junction network 12 with the required phase to produce two output signals, one for right-hand circular polarization and the other for left-hand circular polarization. Phase shift network 13 provides the proper phase adjustment. If pure circular polarization is received, one output is maximum and the other disappears. When linearly polarized signals are being received, the two outputs of hybrid network 12 are equal in amplitude. Similarly, the $TM_{01}$ and $TE_{01}$ error signals ($TM_{01}'$ and $TE_{01}'$ after compensation) are combined, with the necessary phase relationship being established by phase shift network 14, in hybrid junction network 15. Two outputs are provided; one for the right-hand and the other for the left-hand circular polarization component. Hybrid networks 12 and 15, and indeed all of the hybrid networks employed in the system, may be typically 3.0 db magic-tee or rat-race junctions. Any form of microwave phase shifter may be employed, for example, a coaxial or waveguide shifter.

Switches 16 and 17 select the right-hand or left-hand circular components of the error and reference channels, respectively, from the hybrid networks. The selected signals are amplified and brought to standard levels in normalizers 18 and 19 and then applied to product detectors (multipliers) 20 and 21. A 90° phase shift is required in one of the channels. Phase shift network 22 provides the requisite shift. Switch 23, which operates in synchronism with switches 16 and 17, permits the phase of the error channel to be reversed, for example, by supplying the output of multiplier 21 to the output circuit either directly or by way of the 180° phase shift network 24. The output signals supplied from the multipliers may be used for directing antenna 11 toward a target S.

Mode compensating network 30 establishes the necessary balance between the reference and the error signal channels, in accordance with the invention, in order to overcome the effects on the nulls in the boresight direction produced by extraneous $TE_{11x}$ and $TE_{11y}$ components. Accordingly, the nulls are made to occur at the boresight coordinates and the depth of the nulls are substantially increased. Two orthogonal balances are employed so that compensation is achieved for all angles of elliptically polarized signals. The mode compensator accomplishes balance by feeding a small amount of the $TE_{11x}$ and the $TE_{11y}$ signals into the $TM_{01}$ and $TE_{01}$ channels. The small balancing signals are adjusted in amplitude and phase, for example, by bridge networks provided with means for adjusting the phase of signals in selected arms of the bridge. During transmission, a selected $TE_{11y}$ mode energy voltage, for example, may be added algebraically to the signal supplied to the $TM_{01}$ mode coupler and, during reception, a selected $TE_{11x}$ energy voltage from the $TE_{11x}$ coupler may be algebraically subtracted from the $TM_{01}$ signal. Both actions, being reciprocal, are effective to enhance the null of the $TM_{01}$ signal in the desired boresight direction.

Figure 2:
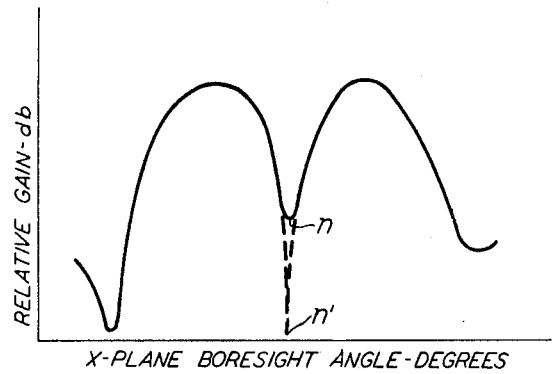
FIG. 2 illustrates the improvement in the null developed on boresight as a result of the employment of the compensating system of the invention.

FIG. 2 illustrates the improvement. Without the compensation afforded by the present invention, the null $n$, for example of the $TM_{01}$ mode in the boresight direction, lacks a definitive sharpness. With compensation a sharp null $n'$ is produced.

Figure 3:
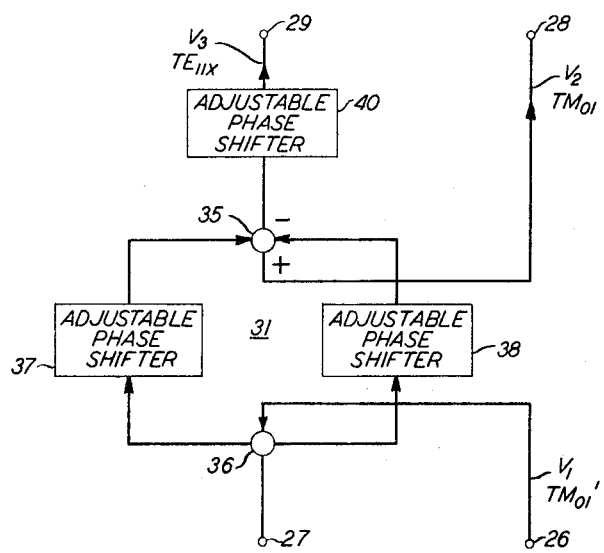
FIG. 3 illustrates by way of example a suitable combining network for use in the compensating network of the system of FIG. 1.

FIG. 3 illustrates, by way of example, a combining circuit that may be employed in the practice of the invention for algebraically combining $TE_{11x}$ signals with fundamental $TM_{01}$ mode energy signals. Since the combining action is a reciprocal one, and even though the compensating network of the preferred embodiment of the invention is directed to a condition of signal reception, it is convenient to illustrate the combining action mathematically in the transmit mode of operation. Consequently, the signal flow arrows and hybrid output legends, shown in FIG. 3, are applicable only for the transmit mode of operation. The sum and difference outputs of the hybrid are indicated by the plus (+) sign and negative (−) sign, respectively. Assume for example, that a signal $V_1$ is applied to the $TM_{01}'$ terminal 26 of the network of FIG. 3, but that no signal is applied to the $TE_{11x}'$ terminal 27. Assume further that a small $TE_{11x}$ mode energy signal must be launched in order to obtain the desired null in the $x$ plane of the $TM_{01}$ mode signal pattern. In accordance with the invention, the $TM_{01}'$ signal is coupled from terminal 26 to the $TM_{01}$ mode coupler terminal 28 and in addition a selected portion of this signal is delivered to the $TE_{11x}$ coupler terminal 29. In the typical network shown, signal $V_1$ is applied to one port of hybrid 36. In well-known fashion, the applied signal divides equally in the junction between the ports of the "opposite pair," but does not appear at the port conjugate to the one to which it is applied. One branch signal is supplied by way of adjustable phase shifter 37 to one port of hybrid 35, and the other is directed through adjustable phase shifter 38 to the other, conjugate port of hybrid 35. Again, in well-known fashion, the sum of the applied signals appears at one of the "opposite pair" of ports of hybrid junction 35 and the difference appears at the other one of the pair. In this case, the sum signal is supplied to $TM_{01}$ coupler terminal 28 and the difference to adjustable phase shifter 40 and to $TE_{11x}$ coupler terminal 29.

If an applied signal $V_1$ is of the form $$V_1 = V_1 \cos \omega t \quad (1)$$

the signal delivered to the $TM_{01}$ coupler is, after passing through the network of FIG. 3, $$V_2 = V_1 \cos \frac{\varphi_1}{2} \cos \left( \omega t - \frac{\varphi_1}{2} \right) \quad (2)$$

and the signal delivered to the $TE_{11x}$ coupler is $$V_3 = V_1 \sin \frac{\varphi_1}{2} \sin \left( \omega t - \frac{\varphi_1}{2} - \varphi_2 \right) \quad (3)$$

In the equations, $\varphi_1$ represents the phase shift imparted to the signal by phase shifter 37 and $\varphi_2$ represents the phase shift imparted by phase shifter 40. It is assumed for the moment that shifter 38 is adjusted for zero phase shift. Phase shifter 37 thus acts as a variable amplitude attenuator in the network and controls the portion of the $TM_{01}'$ signal supplied to hybrid filter 35. If $\varphi_1 = 0$, no energy is transferred to the $TE_{11x}$ coupler terminal 29. For $\varphi_1 = 180°$, all the energy is guided to the $TE_{11x}$ coupler terminal and no energy is delivered to the $TM_{01}$ coupler terminal. In a practical application, $\varphi_1$ is typically adjusted to be within $\pm 15°$ so that only a small amount of the $TM_{01}$ signal is diverted to the $TE_{11x}$ coupler. A change of $\varphi_1$ not only changes the extent of the signal division but also the phase of $\omega_2$ and $V_3$ by $\varphi_1/2$. An independent phase adjustment is available, by means of phase shifter 40, to provide the phase shift necessary for complete compensation.

In practice, it has been found that an adjustable phase shifter in one arm only of the network 31 is sufficient to provide the necessary signal attenuation; a second shifter may be used, of course, to extend the range of control, or to eliminate the phase dependence of $V_2$ and $V_3$ on $\varphi_1$.

Accordingly, with suitable adjustment of the phase shifters in the branch arms of network 31, the extent of the algebraic mixing of the two signals is controlled and the portion of each signal which appears at each output terminal is regulated.

Compensating network 30 in the system illustration in FIG. 1 employs four combining circuits, 31, 32, 33 and 34, each of the form shown in FIG. 3, interconnected to afford compensation over a wide range of signal magnitudes, frequencies and phases. Considering the case in which a signal is being received by antenna 11, four signals representative of four modes of wave energy are supplied to compensating network 30 from coupler 10. The signal flow arrows and hybrid legends, shown in FIG. 1, are applicable only for the receptive mode of operation. The sum and difference outputs of the individual hybrid couplers are indicated by the plus (+) sign and the negative (−) sign, respectively. It is assumed that extraneous $TE_{11x}$ and $TE_{11y}$ components appear in the $TM_{01}$ and $TE_{01}$ channels. These components are balanced out in accordance with the invention by a selected, multiple combining program.

$TM_{01}$ mode energy is accordingly supplied from coupler 10 to combining circuit 31 wherein a selected portion of the $TE_{11x}$ signal from coupler 10 is algebraically subtracted from it. The $TM_{01}$ signal is applied to one port of hybrid 35 and the $TE_{11x}$ signal is supplied from the coupler by way of adjustable phase shifter 40 to the other input port. Sum and difference signals which appear at the outputs of hybrid 35 are supplied to a pair of input ports of hybrid 36. The magnitude of the $TE_{11x}$ component is adjusted by phase shifter 37 and the signal supplied in the difference terminal of hybrid 36, which represents the $TM_{01}$ signal after the contaminating $TE_{11x}$ component has been removed, is supplied to combining network 32. The $TE_{11x}$ signal supplied in the sum output of hybrid 36 is delivered by way of phase shifter 39 to combining network 33.

In network 32, the $TM_{01}$ signal is algebraically combined with a portion of the $TE_{11y}$ signal supplied to the network by way of adjustable phase shifter 41. Sum and difference signals developed by hybrid 42 are recombined in hybrid 43. Adjustable phase shifter 44 establishes the degree of mixing so that the difference signal supplied by one output port of hybrid 43 constitutes the $TM_{01}$ signal devoid of all traces of the $TE_{11y}$ signal. This signal, which may be denoted as the modified or $TM_{01}'$ signal, is delivered to error signal processing network, i.e., to hybrid 15. The $TE_{11y}$ sum signal produced by hybrid 43 is supplied by way of phase shifter 45 to combining network 34.

The $TE_{01}$ signal developed by coupler 10 is supplied to one input terminal of hybrid 46 in network 33 wherein an appropriate $TE_{11x}$ signal is subtracted from it. As in the other networks, the signals from hybrid 46 are supplied to conjugate ports of hybrid 47. Phase shifter 48 establishes the mixing ratio. The difference signal, representing the $TE_{01}$ signal less the $TE_{11x}$ component, is thereafter delivered to network 34, and $TE_{11x}'$ sum signal from hybrid 47 is delivered to the processing network, i.e., to one terminal of hybrid 12.

In network 34, the $TE_{01}$ and the $TE_{11y}$ signals are mixed in hybrid 49 and supplied by way of two arms to hybrid 50. Phase shifter 51 in one arm attenuates the $TE_{11y}$ signal so that the sum and difference signals of hybrid 50 constitute the $TE_{01}$ signal devoid of $TE_{11x}$ components, i.e., the $TE_{01}'$ signal, and the $TE_{11y}'$ signal. Both of these signals are supplied to the signal processing network, the $TE_{01}'$ signal to phase shifter 14 and the $TE_{11y}'$ signal to phase shifter 13.

It is apparent that an interconnected network of combining circuits may be employed to accommodate any number of separate mode energy signals. In addition, a wide range of control is afforded in the algebraic combination of selected ones of the mode energy signals. In practice, it has been found that certain of the phase adjustments are frequency sensitive, and that mode signal contamination similarly varies with frequency. Accordingly, it is convenient to calibrate the several phase shifters against frequency so that the compensating network may be used in a wide variety of system applications. It is evident that various other modifications and interconnections may be devised by those skilled in the art to enhance even further the versatility of the system without, however, departing from the spirit and scope of the invention.

What is claimed is:
1. A tracking system which includes in combination:
means for receiving a radio frequency signal;
means for developing individual signals representative of a number of different modes of propagation excited by said radio frequency signal in said receiving means;
means for algebraically summing selected ones of said mode signals with others of said mode signals to compensate for spurious mode signal components present in said other mode signals; and
means for selectively combining said compensated signals to develop signals indicative of the direction of reception of said radio frequency signal with respect to said system.

2. A tracking system which includes, in combination,
means for receiving arbitrarily polarized electromagnetic wave energy signals,
means for developing individual signals representative of a number of different modes of propagation excited by said wave energy in said receiving means,
means for compensating for undesired mode signals which contaminate individual ones of said signals, said compensating means including means for algebraically summing selected components of a contaminating mode signal with a contaminated mode signal thereby to cancel undesired mode signals from a desired signal, and
means for selectively combining said compensated signals to develop signals indicative of the direction of reception of said arbitrarily polarized signals with respect to said system.

3. A tracking system as defined in claim 2 wherein said selected components of contaminating signal are adjusted in amplitude and phase prior to algebraic summation with said contaminated mode signals.

4. A system for determining the position of a source of incoming electromagnetic wave energy comprising, in combination:
a directional antenna system;
an electromagnetic wave element receptively excitable in a plurality of different modes of propagation;
means for developing a signal primarily representative of the energy received in said wave element in each one of said reception modes,
means for eliminating spurious energy signals from said representative signals which includes,
means for algebraically summing with each one of said energy signals a selected portion of each of the other energy signals, and
means for selectively processing said algebraically summed signals to develop a pair of error signals representative of the direction of reception of said incoming electromagnetic wave energy.

5. A system as defined in claim 4 wherein, said means for algebraically summing selected signals with one another comprises,
means for adjusting the phase of selected mode energy signals,
means including a first hybrid network supplied with a selected pair of mode energy signals for developing a first pair of sum and difference signals,
means for adjusting the relative magnitudes of said signals of said first pair,
means including a second hybrid network supplied with said adjusted signals of said first pair for developing a second pair of sum and difference signals, and
means for selectively delivering said second sum signal and said second difference signal to said processing means.

6. An antenna tracking system which comprises, in combination,
a directional antenna system,
first means associated with said antenna system receptively excitable by at least two higher order modes of propagation, means for developing signals individually representative of higher order mode signals excited in said first associated means, means for eliminating undesired mode signals from said higher order mode signals, said eliminating means including second means associated with said antenna system receptively excitable by two modes of propagation that are orthogonal components of the fundamental mode of propagation, means for developing signals individually representative of said orthogonal mode signals excited by said second associated means, means for individually adjusting the magnitude and phase of each of said orthogonal mode signals, means for selectively combining said adjusted orthogonal mode signals with each of said higher order mode signals, and means for utilizing said combined higher order mode signals and said orthogonal mode signals for controlling the tracking direction of said antenna system.

7. An antenna tracking system as defined in claim 6 wherein said first means associated with said antenna system is excited by the $TM_{01}$ and $TE_{01}$ modes of propagation, and wherein said second means associated with said antenna system is excited by the $TE_{11x}$ and the $TE_{11y}$ modes of propagation.

8. A compensating network for enhancing tracking nulls in higher order mode signals developed in a tracking antenna system which comprises, in combination, means for adjusting the phase of selected mode energy signals developed in said system, a plurality of signal combining networks, means for supplying each of said combining networks with one orthogonal component of the fundamental mode signal, means for delivering each of said higher order mode signals in turn to selected ones of said combining networks, and means for delivering one of the algebraic sum signals developed by each of said networks to a processing network.

9. A compensating network as defined in claim 8 wherein each of said combining networks comprises, means including a first hybrid network supplied with one of said orthogonal mode signals and one of said higher order mode signals for producing a first pair of sum and difference output signals, means for adjusting the magnitude of one of said pair of output signals, and means including a second hybrid network supplied with said adjusted signal and the other of said pair of signals produced by said first hybrid network for developing a second pair of sum and difference output signals.

10. A compensating network as defined in claim 9 wherein said means in each of said networks for adjusting the magnitude of one of said pair of signals comprises an adjustable phase shifter.

11. A compensation network as defined in claim 8 in further combination with means including an adjustable phase shifter for individually adjusting the magnitudes of said orthogonal mode signals supplied to said combining networks.

References Cited

UNITED STATES PATENTS 3,259,899  7/1966  Cook _____ 343—16.1 X

RODNEY D. BENNETT, *Primary Examiner.*

CHESTER L. JUSTUS, *Examiner.*

D. C. KAUFMAN, *Assistant Examiner.*